(12) United States Patent
Yasuda et al.

(10) Patent No.: US 8,870,470 B2
(45) Date of Patent: Oct. 28, 2014

(54) OPTICAL MODULE AND METHOD FOR PRODUCING THE SAME

(71) Applicant: Hitachi Cable, Ltd., Tokyo (JP)

(72) Inventors: Hiroki Yasuda, Mito (JP); Hiroshi Ishikawa, Hitachi (JP); Kouki Hirano, Hitachinaka (JP); Juhyun Yu, Mito (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 13/746,767

(22) Filed: Jan. 22, 2013

(65) Prior Publication Data

US 2013/0188906 A1 Jul. 25, 2013

(30) Foreign Application Priority Data

Jan. 24, 2012 (JP) ................. 2012-012202

(51) Int. Cl.
*G02B 6/36* (2006.01)
*G02B 6/12* (2006.01)

(52) U.S. Cl.
CPC ..................... *G02B 6/12* (2013.01)
USPC .................. 385/88; 385/53; 385/89; 385/90; 385/91

(58) Field of Classification Search
CPC .......... G02B 6/4292; G02B 6/36; G02B 6/42; G02B 6/30
USPC .................... 385/53, 88, 89, 90, 91
See application file for complete search history.

(56) References Cited

U.S. PATENT DOCUMENTS

| 6,819,840 | B2 * | 11/2004 | Tohgoh et al. ................. 385/49 |
| 7,905,663 | B2 | 3/2011 | Yasuda et al. |
| 2009/0324171 | A1 | 12/2009 | Yasuda et al. |

FOREIGN PATENT DOCUMENTS

| JP | 2003-014946 A | | 1/2003 |
| JP | 2003207691 | * | 7/2003 |
| JP | 2006-292852 A | | 10/2006 |
| JP | 2008-122721 A | | 5/2008 |
| JP | 2009-145817 A | | 7/2009 |
| JP | 2010-010254 A | | 1/2010 |

OTHER PUBLICATIONS

United States Office Action dated Mar. 27, 2014 in U.S. Appl. No. 13/746,788.

* cited by examiner

*Primary Examiner* — Jennifer Doan
(74) *Attorney, Agent, or Firm* — McGinn IP Law Group, PLLC

(57) ABSTRACT

An optical module includes a substrate, an optical device of a surface-emitting element or a surface-receiving element mounted on a surface of the substrate with a light-emitting portion or a light-receiving portion located to face the surface of the substrate, an optical fiber disposed parallel to the surface of the substrate and in a longitudinal direction of the substrate, a mirror provided to face the light-emitting portion or the light-receiving portion of the optical device and a tip of the optical fiber, and optically connect the optical device and the optical fiber, and an optical fiber receiving groove provided in the surface of the substrate to receive the optical fiber. A width of the mirror is greater than a width of the optical fiber receiving groove. Reflecting portions are provided on edges, respectively, of a mirror side end of the optical fiber receiving groove, and the reflecting portions reflect incident light from the mirror facing the edges, again back to the facing mirror.

14 Claims, 4 Drawing Sheets

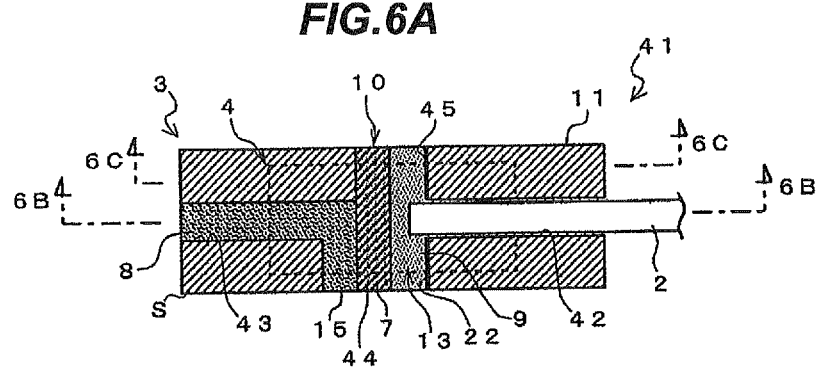
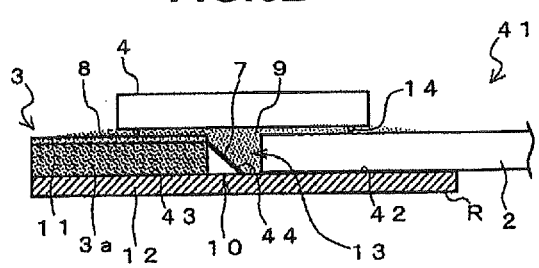 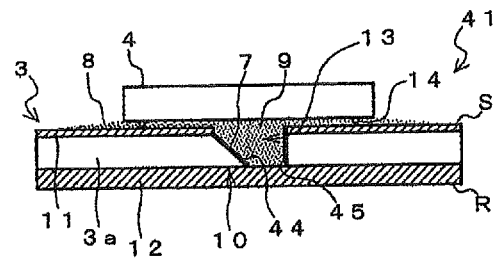

OPTICAL MODULE AND METHOD FOR PRODUCING THE SAME

The present application is based on Japanese patent application No. 2012-012202 filed on Jan. 24, 2012, the entire contents of which are incorporated herein by reference.

BACKGROUND OF THE INVENTION

1. Field of the Invention

The present invention relates to an optical module using an optical device comprising a surface-emitting element or a surface-receiving element. It also relates to a producing method for that optical module.

2. Description of the Related Art

In an optical module using an optical device comprising a surface-emitting element or a surface-receiving element, when the optical device is mounted on a substrate, an optical axis of the optical device is perpendicular to a surface of the substrate. Therefore, in order to optically connect an optical fiber disposed parallel to the surface of the substrate and the optical device together, a mirror is used to rotate the optical axis through 90 degrees.

As this type of optical module, there is conventionally known one in which the optical fiber and the optical device are optically connected together via an optical waveguide with a mirror formed by forming the optical waveguide on the substrate, and forming in the optical waveguide the mirror inclined at 45 degrees to the surface of the substrate (see e.g. JP-A-2010-10254 listed below).

Refer to JP-A-2010-10254, JP-A-2008-122721, JP-A-2009-145817, JP-A-2006-292852, and JP-A-2003-14946, for example.

SUMMARY OF THE INVENTION

However, there is a disadvantage in that the conventional optical module described above is time-consuming to produce, and is costly, due to requiring the active mounting of the optical device on the substrate.

Specifically, in the conventional optical module described above, when the optical device is mounted on the substrate, the position of the mirror is not visible. Therefore, mounting the optical device comprising the surface-emitting element for example is very time-consuming, due to requiring connecting a power supply to the optical device, causing the optical device to emit light, measuring the amount of the light output from the optical waveguide, and mounting the optical device at such a position that the amount of the light measured is the largest.

In view of the above circumstances, it is an object of the present invention to provide an optical module and a producing method therefor, which facilitates the mounting of an optical device, and which is easy to produce and low in cost.

(1) According to one embodiment of the invention, an optical module comprises:
  a substrate;
  an optical device comprising a surface-emitting element or a surface-receiving element mounted on a surface of the substrate with a light-emitting portion or a light-receiving portion located to face the surface of the substrate;
  an optical fiber disposed parallel to the surface of the substrate, and in a longitudinal direction of the substrate;
  a mirror provided to face the light-emitting portion or the light-receiving portion of the optical device and a tip of the optical fiber, and optically connect the optical device and the optical fiber; and
  an optical fiber receiving groove provided in the surface of the substrate to receive the optical fiber,
  in which a width of the mirror is greater than a width of the optical fiber receiving groove, and
  in which reflecting portions are provided on edges, respectively, of a mirror side end of the optical fiber receiving groove, and the reflecting portions reflect incident light from the mirror facing the edges, again back to the facing mirror.

In one embodiment, the following modifications and changes can be made.

(i) Each of side portions of the mirror, which face the reflecting portions, is preferably not less than 50 μm in width.

(ii) A distance between a reflecting portion side end of the mirror and the reflecting portions is preferably not more than 200 μm.

(iii) The optical module may further comprise
  a damming member provided between the optical device and the substrate to extend in a width direction of the substrate and partition a gap between the optical device and the substrate in a longitudinal direction of the substrate,
  wherein the mirror is formed on one optical fiber side of the damming member,
  the gap on an opposite side of the damming member to the optical fiber is filled with an underfill resin, and
  the gap on the optical fiber side of the damming member is filled with an optical fiber fixing resin.

(2) According to another embodiment of the invention, a method for producing an optical module with a substrate; an optical device comprising a surface-emitting element or a surface-receiving element mounted on a surface of the substrate with a light-emitting portion or light-receiving portion located to face the surface of the substrate; an optical fiber disposed parallel to the surface of the substrate, and in a longitudinal direction of the substrate; a mirror provided to face the light-emitting portion or the light-receiving portion of the optical device and a tip of the optical fiber, and optically connect the optical device and the optical fiber; and an optical fiber receiving groove provided in the surface of the substrate to receive the optical fiber, a width of the mirror being greater than a width of the optical fiber receiving groove, the method comprising:
  forming reflecting portions on edges, respectively, of a mirror side end of the optical fiber receiving groove to reflect incident light from the mirror facing the edges, again back to the facing mirror;
  illuminating the mirror from above the substrate;
  extracting a dark portion lying between portions brightened by reflection off the reflecting portions to thereby extract a mirror portion facing the optical fiber receiving groove; and
  aligning the optical device to locate the light-emitting portion or the light-receiving portion in the middle in top view of the mirror portion facing the optical fiber receiving groove, to mount the optical device (Points of the Invention)

According to the present invention, it is possible to provide the optical module and the method for producing the same, which facilitates the mounting of the optical device, and which is easy to produce and low in cost.

BRIEF DESCRIPTION OF THE DRAWINGS

The preferred embodiments according to the invention will be explained below referring to the drawings, wherein:

FIG. 6A is an enlarged view showing an essential portion of an optical module in another embodiment according to the invention;

FIG. 6B is a cross-sectional view taken along line 6B-6B in FIG. 6A; and

FIG. 6C is a cross-sectional view taken along line 6C-6C in FIG. 6A.

DETAILED DESCRIPTION OF THE PREFERRED EMBODIMENTS

Below are described preferred embodiments according to the invention, in conjunction with the accompanying drawings.

Figure 1A:
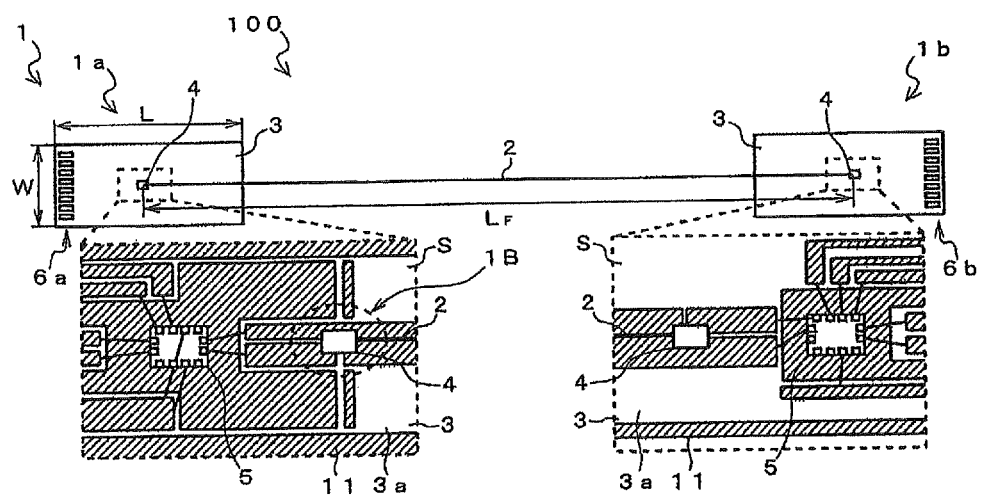
FIG. 1A is a plan view showing a cable with optical modules and an enlarged view showing an essential portion thereof in one embodiment according to the invention.
Figure 1B:
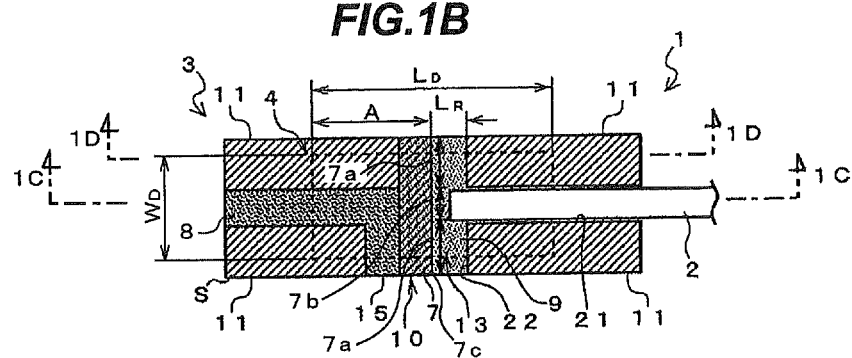
FIG. 1B is an enlarged view of a portion 1B thereof.
Figure 1C:
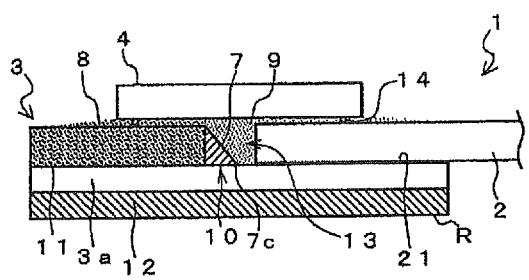
FIG. 1C is a cross-sectional view taken along line 1C-1C in FIG. 1B.
Figure 1D:
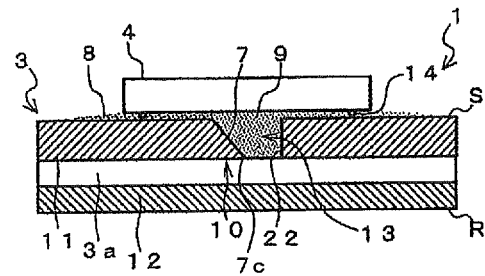
FIG. 1D is a cross-sectional view taken along line 1D-1D in FIG. 1B.

FIG. 1A is a plan view showing a cable with optical modules and an enlarged view showing an essential portion thereof in one embodiment according to the invention. FIG. 1B is an enlarged view of a portion 1B thereof. FIG. 1C is a cross-sectional view taken along line 1C-1C in FIG. 1B. FIG. 1D is a cross-sectional view taken along line 1D-1D in FIG. 1B.

As shown in FIG. 1A, a cable 100 with optical modules includes an optical fiber 2 and optical modules 1 provided at both ends of an optical fiber 2. One end (in the left side of FIG. 1A) of the optical fiber 2 is provided with a transmitting side optical module 1a, while the other end (in the right side of FIG. 1A) of the optical fiber 2 is provided with a receiving side optical module 1b.

The optical modules 1 (1a, 1b) includes a substrate 3, an optical device 4 comprising a surface-emitting element or a surface-receiving element mounted on a surface S of the substrate 3 with a light emitting portion or a light receiving portion located to face the surface of the substrate 3 (i.e. the substrate 3 side), and an IC 5 electrically connected to the optical device 4. The optical fiber 2 is disposed parallel to the surface S of the substrate 3, and in a longitudinal direction (in the horizontal direction in FIG. 1A) of the substrate 3. A length L of the substrate 3 is e.g. 5 to 15 mm, and the width W of the substrate 3 is e.g. 2 to 5 mm. In addition, and a length $L_F$ of the optical fiber 2 is e.g. 0.1 to 50 m.

In this embodiment, as the substrate 3, a flexible printed circuit board (FPC) formed with wiring patterns 11 and 12 on a surface S and a reverse surface R, respectively, of a film substrate 3a made of polyimide (see FIGS. 1C and 1D) is used. As the wiring patterns 11 and 12, a metal plating layer such as nickel plating, gold plating or the like formed over a copper surface is used.

In the transmitting side optical module 1a, as the optical device 4, the surface-emitting element such as a VCSEL (Vertical Cavity Surface Emitting Laser) or the like is used. As the IC 5, a driver IC is used for driving the optical device 4. At an end (at the left end in FIG. 1A) of the substrate 3 of the transmitting side optical module 1a, a plurality of connecting terminals 6a are formed to be aligned with each other.

The substrate 3 of the transmitting side optical module 1a is designed such that connecting terminals 6a are connected to the FPC connector provided on a body substrate (not shown) so that the substrate 3 of the transmitting side optical module 1a is mounted on the body substrate. An end of the body substrate is provided with an input connector such as a card edge connector or the like, so that an input connector is connected to a transmitting side external device (not shown). In the transmitting side optical module 1a, an electrical signal input through the input connector, the body substrate, the FPC connector and the connecting terminals 6a from the transmitting side external device is converted into an optical signal by the optical device 4, and outputted to the optical fiber 2.

On the other hand, in the receiving side optical module 1b, as the optical device 4, the surface-receiving element such as a PD (Photo Diode) or the like is used. As the IC 5, uses an amplifier IC to amplify the electrical signal from the optical device 4. At an end (at the right end in FIG. 1A) of the substrate 3 of the receiving side optical module 1b, a plurality of connecting terminals 6b are formed to be aligned with each other.

The substrate 3 of the receiving side optical module 1b is designed to connect connecting terminals 6b to the FPC connector provided on a body substrate (not shown) so that the substrate 3 of the receiving side optical module 1b is mounted on the body substrate. An end of the body substrate is provided with an output connector such as a card edge connector or the like, so that an output connector is connected to a receiving side external device (not shown). In the receiving side optical module 1b, an optical signal input from the optical fiber 2 is converted into an electrical signal by the optical device 4, and outputted via the connecting terminals 6b, the FPC connector, the body substrate, and the output connector to the receiving side external device.

The structure of the portion connecting the optical device 4 and the optical fiber 2 is described in detail below with reference to FIGS. 1B to 1D. In addition, FIGS. 1B to 1D show the enlarged view of the portion connecting the optical device 4 and the optical fiber 2 in the transmitting side optical module 1a, and the receiving side optical module 1b is also structured totally in the same way. Further, in FIG. 1B, the optical device 4 is indicated by a dashed line, and FIG. 1B shows the plan view when seen through the optical device 4.

As shown in FIGS. 1B to 1D, the optical module 1 includes a mirror 7 provided to face the light emitting portion of the optical device 4 and the tip of the optical fiber 2 and optically connect the optical device 4 and the optical fiber 2, an optical fiber receiving groove 21 provided in the surface S of the substrate 3 to receive the optical fiber 2, an underfill resin 8 filled between the optical device 4 and the substrate 3 and cured to reinforce the connection strength for the optical device 4 to the substrate 3, and an optical fiber fixing resin 9 used to fix the optical fiber 2 to the substrate 3.

The optical device 4 is flip-chip mounted on the wiring pattern 11 with the use of bumps 14. The optical device 4 has electrodes (not shown) at four corners respectively in a bottom view, and the bumps 14 are provided in correspondence to the electrodes respectively. The coating around the tip of the optical fiber 2 is removed, and the bare wire thereof is received in the optical fiber receiving groove 21 of the substrate 3.

The optical module 1 in this embodiment includes a damming member 10 provided between the optical device 4 and the substrate 3 to extend in the width direction (in the vertical direction in FIG. 1B) of the substrate 3 and partition the gap 13 between the optical device 4 and the substrate 3 in the longitudinal direction (in the horizontal direction in FIG. 1B)

of the substrate 3. The mirror 7 is formed on one optical fiber 2 side of that damming member 10.

The damming member 10 is for defining the region to be filled with the underfill resin 8 and the region to be filled with the optical fiber fixing resin 9, so that the gap 13 on the opposite side (on the left side in FIG. 1B) of the damming member 10 to the optical fiber 2 is filled with the underfill resin 8, while the gap 13 on the optical fiber 2 side (on the right side in FIG. 1B) of the damming member 10 is filled with the optical fiber fixing resin 9.

In this embodiment, the damming member 10, the wiring pattern 11 formed on the surface S of the substrate 3 is used, and one side of the wiring pattern 11 used for the damming member 10 is inclined at 45 degrees to the surface S of the substrate 3 by processing (e.g., machining such as dicing or the like) to form the mirror 7.

In order to allow the insertion of the optical fiber 2 between the optical device 4 and the film substrate 3a, the distance between the optical device 4 and the film substrate 3a, i.e. the total thickness of the thickness of the wiring pattern 11 and the thickness of the bumps 14 is required to be not less than the outer diameter (i.e. cladding diameter) of the tip of the optical fiber 2. For example, when using the optical fiber 2 with the cladding diameter of 80 μm, the wiring pattern 11 having a copper layer with a thickness of around 70 μm may be used. The thickness of the film substrate 3a is e.g. 25 μm.

It should be noted that in this embodiment, since the wiring pattern 11 is formed to be thick, the optical fiber receiving groove 21 is formed by using this thick wiring pattern 11 formed. Specifically, the two wiring patterns 11 in the right side of FIG. 1B to be connected with the bumps 14 of the optical device 4 are formed to extend parallel in the longitudinal direction, and are configured to receive the tip of the optical fiber 2 in the gap between the two wiring patterns 11, i.e., the gap between the two wiring patterns 11 constitutes the optical fiber receiving groove 21 to receive the optical fiber 2. The width of the optical fiber receiving groove 21 (the spacing between the two wiring patterns 11) are set to be substantially equal to the outer diameter (cladding diameter) of the tip of the optical fiber 2.

In this embodiment, the two wiring pattern 11 in the left side of FIG. 1B to be connected with the bumps 14 of the optical device 4 are also formed to extend parallel in the longitudinal direction, and fill the gap between the two wiring patterns 11 with the underfill resin 8. Here, the left upper wiring pattern 11 in FIG. 1B is shown to be connected to the damming member 10, but the left upper wiring pattern 11 may be not connected to the damming member 10.

Further, in this embodiment, the resins 8 and 9 are filled from both sides in the longitudinal direction of the optical device 4 toward the damming member 10. In this case e.g. if the left lower wiring pattern 11 in FIG. 1B is connected to the damming member 10, the underfill resin 8 cannot escape during the filling, but is likely to pass through a small gap between the optical device 4 and the damming member 10 and overflow to the opposite side of the damming member 10. To avoid the occurrence of this event, it is necessary to form a vent 15 adjacent to the damming member 10 in the wiring pattern 11 to allow unnecessary resins 8 and 9 to escape in the width direction during the filling.

A length A of the optical device 4 on the opposite side of the optical fiber 2 side end of the damming member 10 to the optical fiber 2 is preferably not less than ⅓ of the element length $L_D$ of the optical device 4. This is because if the length A is less than ⅓ of the element length $L_D$ of the optical device 4, the sufficient connection strength for the optical device 4 to the substrate 3 may be unable to be ensured due to the lessening of the area fixed by the underfill resin 8.

In addition, the width of the damming member 10 is preferably not less than the width of the optical device 4. This is because if the width of the damming member 10 is less than the width of the optical device 4, the underfill resin 8 or the optical fiber fixing resin 9 may, during the filling thereof, pass across the damming member 10 and enter the region on the opposite side of the damming member 10.

The underfill resin 8 and the optical fiber fixing resin 9 may use the same resins respectively, or may use the different resins respectively. In addition, it is preferable that the underfill resin 8 which is relatively high in hardness after curing is used, so as to securely fix the optical device 4 to the substrate 3. On the other hand, the optical fiber fixing resin 9 which is for fixing the tip of the optical fiber 2 to the substrate 3 is not required to be as high in hardness as the underfill resin 8, because the tip of the optical fiber 2 is received in the gap between the wiring patterns 11. Moreover, it is preferable from the point of view of the lasting reliability of the optical module 1 that the optical fiber fixing resin 9 which is relatively low in hardness after curing is used, so as to serve to absorb the difference in linear expansion between the optical fiber 2 and the substrate 3. Therefore, for the ensuring of the sufficient connection strength for the optical device 4 to the substrate 3 and for the lasting reliability of the optical module 1, it is preferable that the underfill resin 8 and the optical fiber fixing resin 9 use the different resins respectively, so that the optical fiber fixing resin 9 is softer (lower in hardness after curing) than the underfill resin 8, Now, in the optical module 1 in this embodiment, a width $W_M$ (the length in the vertical direction in FIG. 1B) of the mirror 7 is formed to be greater than a width $W_G$ of the optical fiber receiving groove 21, and an edge on the mirror 7 side end of the optical fiber receiving groove 21 is formed with a reflecting portion 22 that reflects incident light from the mirror 7 facing that edge, again back to the facing mirror 7.

Herein, because the optical fiber receiving groove 21 is defined by the two wiring patterns 11, the mirror 7 side end faces of both the wiring patterns 11 are used as the reflecting portions 22, respectively. It should be noted, however, that the reflecting portions 22 are not limited thereto, but may be formed by separately providing a metal film or the like on the edges of the mirror 7 side end of the optical fiber receiving groove 21. The reflecting portions 22 are formed to be substantially perpendicular to the surface S of substrate 3.

Figure 2:
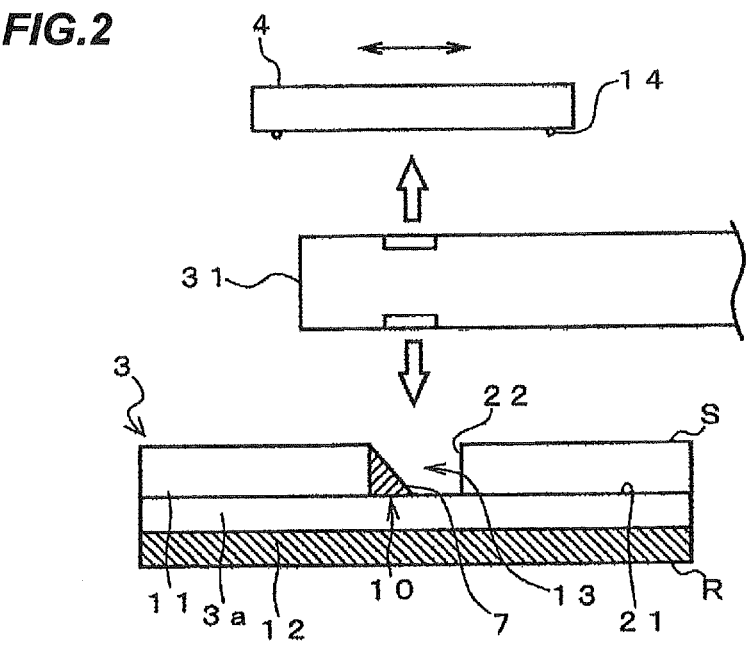
FIG. 2 is a diagram illustrating a procedure for mounting an optical device on a substrate.

The optical device 4 is mounted as follows: As shown in FIG. 2, the optical device 4 is arranged above the substrate 3, and a 2-field camera 31 is inserted between the substrate 3 and the optical device 4. The optical device 4 is aligned by checking upper and lower images with the 2-field camera 31. After the alignment of the optical device 4, the 2-field camera 31 is removed from between the substrate 3 and the optical device 4, and the optical device 4 is moved downward and flip-chip mounted.

At this point, forming the width $W_M$ of the mirror 7 to be greater than the width $W_G$ of the optical fiber receiving groove 21 and forming the reflecting portions 22 on the edges, respectively, of the mirror 7 side end of the optical fiber receiving groove 21 allows a portion of imaging light of the 2-field camera 31 to be incident on the mirror 7, and allows a portion of the light reflected off the mirror 7 to be reflected off the reflecting portions 22, again be incident on the mirror 7, and exit the substrate 3 upward.

The mirror 7 includes portions 7a that are facing the reflecting portions 22 and a portion 7b which is facing the optical fiber receiving groove 21.

Figure 3:
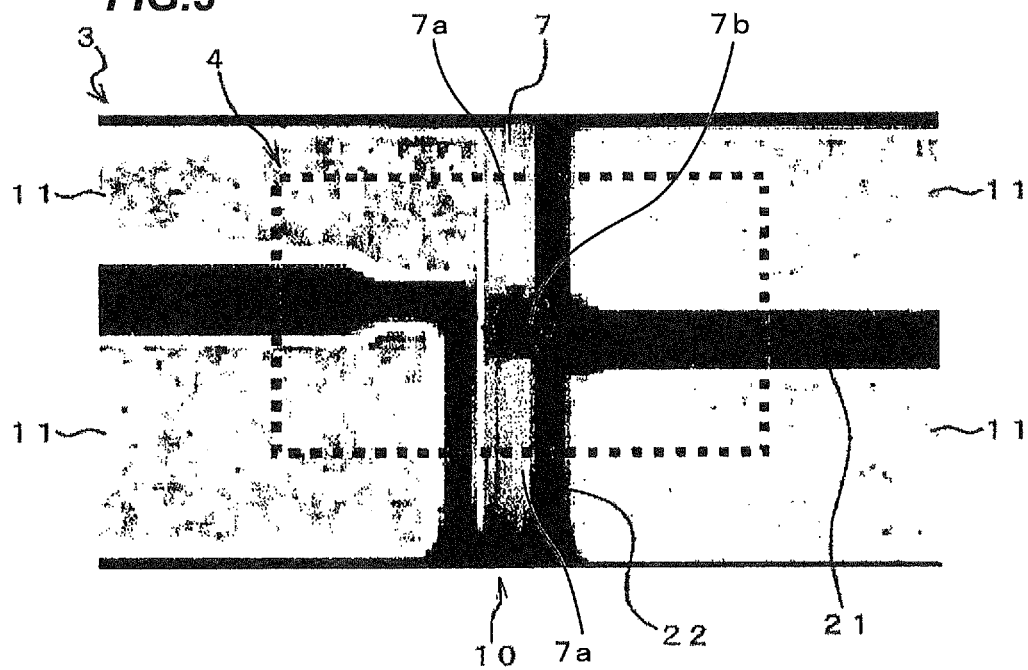
FIG. 3 is a diagram showing an image of the substrate taken by a 2-field camera in FIG. 2.

As a result, an image obtained by the 2-field camera 31 on a side of a substrate 3 is bright only at the portions 7a in the mirror 7, which are facing the reflecting portions 22 as shown in FIG. 3. A dark portion lying between thee portions 7a brightened by the reflection off the reflecting portions 22 is the portion 7b of the mirror 7, which is facing the optical fiber receiving groove 21. Incidentally, if the mirror 7 is only provided at the position facing the optical fiber receiving groove 21, the entire mirror 7 becomes dark, and the portion 7b of the mirror 7, which is facing the optical fiber receiving groove 21 is therefore not visible.

Since the core of the optical fiber 2 that is optically coupled with the optical device 4 is located at the center of the optical fiber receiving groove 21, the optical device 4 may be mounted by such alignment as to locate the light emitting portion or light receiving portion of the optical device 4 in the middle (at the center in the longitudinal direction and the width direction) in top view of the portion (dark portion) 7b of the mirror 7, which is facing the optical fiber receiving groove 21. Incidentally, since the 2-field camera 31 may have a function for recognizing the dark portion of the image acquired, and automatically extracting the middle of the dark portion thereof; the use of the 2-field camera 31 with such a function allows further facilitating of the alignment of the optical device 4.

A width $W_1$ of each of portions 7a of the mirror 7, which are facing the reflecting portions 22 on both sides, is preferably not less than 50 μm. That is, the width $W_M$ of the mirror 7 is preferably not less than (the width $W_G$ of the optical fiber receiving groove 21+the width $W_1$ of the portion 7a of 50 μm×2). This is because if the width $W_1$ of each of the portions 7a of the mirror 7, which are facing the reflecting portions 22 on both sides is less than 50 μm, it is difficult to visibly recognize the light reflected off the reflecting portions 22, and the portion 7b of the mirror 7, which is facing the optical fiber receiving groove 21 is not visible, and it is difficult to align the optical device 4.

In this embodiment, since the mirror 7 is formed on one side of the damming member 10, and also the width of the damming member 10 is preferably not less than the width $W_D$ of the optical device 4 as described above, the width of the damming member 10 and the width $W_M$ of the mirror 7 are preferably not less than the width $W_D$ of the optical device 4, and not less than (the width $W_G$ of the optical fiber receiving groove 21+the width $W_1$ of the portion 7a of 50 μm×2).

In addition, the distance $L_R$ between an end 7c (at a lowermost portion of the mirror 7) on the side of the reflecting portion 22 of the mirror 7 and the reflecting portion 22 is preferably not more than 200 μm. This is because if the distance $L_R$ between the reflecting portion 22 side end 7c of the mirror 7 and the reflecting portion 22 is increased beyond 200 μm, so that the image obtained by the 2-field camera 31 on the side of the substrate 3 blurs in the bright portions due to the reflection off the reflecting portion 22, having vague boundaries between them and the portion 7b of the mirror 7, which is facing the optical fiber receiving groove 21, and lowering the optical device 4 mounting accuracy.

Next, a method for producing the optical module in an embodiment according to the invention will be explained below.

In the optical module producing method in the embodiment according to the invention, first, the substrate 3 formed with the desired wiring patterns 11 and 12 on the front and back sides of the film substrate 3a is produced, and the wiring pattern 11 used for the damming member 10 is formed with the mirror 7 by processing such as dicing or the like.

Figure 4A:
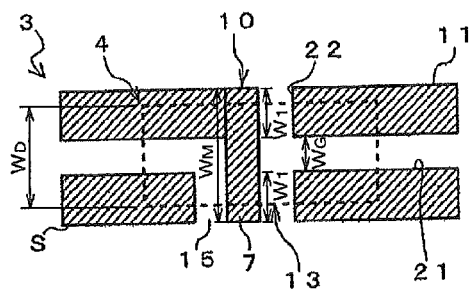
FIGS. 4A to 4C are diagrams for explaining a method for producing an optical module in one embodiment according to the invention.
Figure 4B:
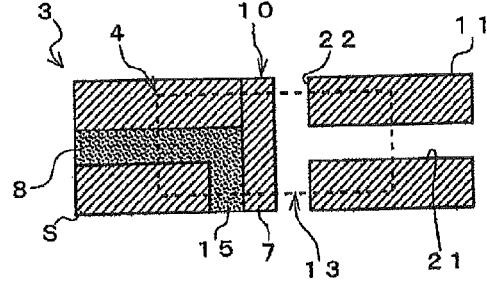

Thereafter, as shown in FIG. 4A, the optical device 4 is flip-chip mounted on the wiring pattern 11. At this point, as shown in FIGS. 2 and 3, the optical device 4 is mounted by illuminating the mirror 7 from above the substrate 2 with the 2-field camera 31, extracting the dark portion (7b) lying between the portions brightened by the reflection off the reflecting portions 22, thereby extracting the portion 7b of the mirror 7, which is facing the optical fiber receiving groove 21, watching the image of the 2-field camera 31 and aligning the optical device 4 to locate the light emitting portion or light receiving portion in the middle in top view of that the portion 7b of the mirror 7, which is facing the optical fiber receiving groove 21. Thereafter, as shown in FIG. 4B, the region on the left side of the damming member 10 is filled with the underfill resin 8 to be cured.

Figure 4C:
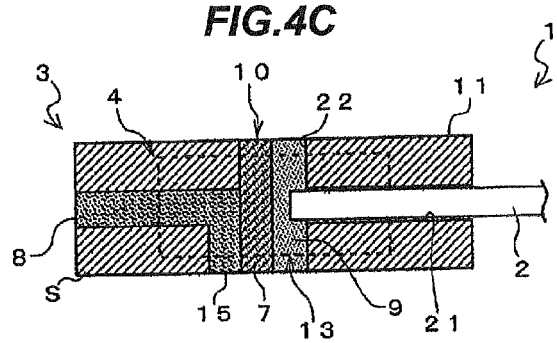

After the underfill resin 8 is cured, as shown in FIG. 4C, the tip of the optical fiber 2 is received in the gap between the two wiring patterns 11 in the right side of FIG. 4C, and the region on the right side of the damming member 10 is filled with the optical fiber fixing resin 9 to be cured.

Thereafter, the IC 5 is mounted on the substrate 3, and the substrate 3 is mounted via the FPC connector on the body substrate produced separately, resulting in the optical module 1 of the invention. In addition, the transmitting side optical module 1a and the receiving side optical module 1b are provided to both the ends of the optical fiber 2 to provide the cable 100 with the optical modules as in FIG. 1A.

Incidentally, although herein it has been described that the optical device 4 is first mounted, the optical fiber 2 may first be mounted.

Figure 5A:
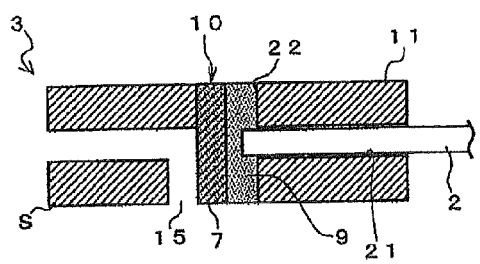
FIGS. 5A to 5C are diagrams for explaining a method for producing an optical module in one embodiment according to the invention.
Figure 5B:
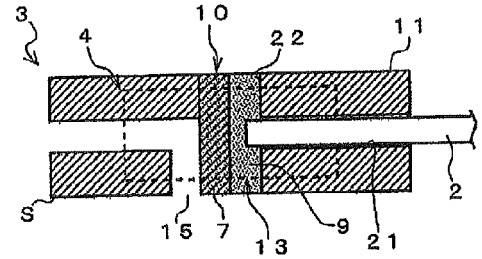
Figure 5C:
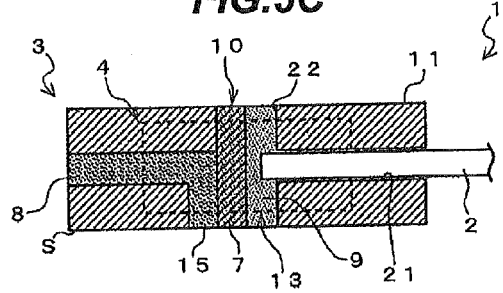

In this case, as shown in FIG. 5A, the tip of the optical fiber 2 is first received in the gap between the two wiring patterns 11 in the right side of FIG. 5A, and the region on the right side of the damming member 10 is filled with the optical fiber fixing resin 9 to be cured. Thereafter, as shown in FIG. 5B, the optical device 4 is flip-chip mounted on the wiring pattern 11, and as shown in FIG. 5C, the region on the left side of the damming member 10 is filled with the underfill resin 8 to be cured, to provide the optical module 1 of the invention.

Incidentally, in the case where the optical fiber 2 is first mounted, in order to cure the optical fiber fixing resin 9 prior to the mounting of the optical device 4, the optical fiber fixing resin 9 does not contribute to the fixation of the optical device 4. On the other hand, in the case where the optical device 4 is first mounted, the optical fiber fixing resin 9 also serves as the underfill to fix the optical device 4 to the substrate 3, therefore allowing further enhancement of the connection strength for the optical device 4 to the substrate 3.

As described above, in this embodiment, the width Wm of the mirror 7 is formed to be greater than the width $W_G$ of the optical fiber receiving groove 21, and the reflecting portions 22 are formed at the edges on the side of the mirror 7 of the optical fiber receiving groove 21, respectively. The reflecting portions 22 reflect incident light from the mirror 7 facing the edges, again back to the facing mirror 7.

With this configuration, it is possible to visibly recognize the mounting position of the optical device 4 during the mounting of the optical device 4 even without the conventional active mounting, and realize the optical module 1, which facilitates the mounting of the optical device 4, and which is easy to produce and low in cost.

In addition, in this embodiment, since the width $W_1$ of each of the portions 7a of the mirror 7, which are facing the reflecting portions 22 on both sides is not less than 50 μm, during the mounting of the optical device 4, it is possible to definitely visibly recognize the portions (7a) brightened by the reflection off the reflecting portions 22, and definitely visibly recognize the dark portion (7b) lying between those bright portions (7a), i.e., the portion 7b of the mirror 7, which is facing the optical fiber receiving groove 21.

In addition, in this embodiment, since the distance $L_R$ between the end 7c on the side of the reflecting portion 22 of the mirror 7 and the reflecting portion 22 is not more than 200μm, the portions (7a) brightened by the reflection off the reflecting portions 22 are not blurred, and the portion 7b of the mirror 7, which is facing the optical fiber receiving groove 21 can tend to be visibly recognized.

Furthermore, in this embodiment, the damming member 10 is provided between the optical device 4 and the substrate 3 to extend in the width direction of the substrate 3 and partition the gap 13 between the optical device 4 and the substrate 3 in the longitudinal direction of the substrate 3, so that one optical fiber 2 side of that damming member 10 is formed with the mirror 7, and the gap 13 on the opposite side of the damming member 10 to the optical fiber 2 is filled with the underfill resin 8, while the gap 13 on the optical fiber 2 side of the damming member 10 is filled with the optical fiber fixing resin 9.

With this configuration, the optical device 4 will not slip off the substrate 3 during production, or the connection strength for the optical device 4 to the substrate 3 will not be insufficient, and it is therefore possible to facilitate the mounting of the optical device 4 and the optical fiber 2, and realize the optical module 1, which is easy to produce while ensuring the sufficient connection strength for the optical device 4 to the substrate 3.

Further, since the optical module 1 is configured to directly optically connect the optical device 4 and the optical fiber 2 together via the mirror 7, no optical waveguide and lens are required. The optical module 1 is therefore low in cost.

Further, in this embodiment, since a length A of the optical device 4 on the opposite side of the optical fiber 2 side end of the damming member 10 to the optical fiber 2 is not less than ⅓ of the element length $L_D$ of the optical device 4, it is possible to ensure the sufficient region to be filled with the underfill resin 8, and to ensure the sufficient connection strength for the optical device 4 to the substrate 3, even if a soft resin is used for the optical fiber fixing resin 9.

Furthermore, setting the width of the damming member 10 at not less than the width $W_D$ of the optical device 4 allows preventing the underfill resin 8 or the optical fiber fixing resin 9 from entering the region on the opposite side of the damming member 10 during the filling, therefore enabling further facilitation of fabrication.

Incidentally, it is also conceivable to separately form the damming member 10 and the mirror 7, but in this case, there arises the problem that structure is complicated, and production is time-consuming. Integrally forming the damming member 10 and the mirror 7 allows for simplifying structure and facilitating production and further allows for miniaturization as well.

Next, another embodiment according to the invention will be explained below.

An optical module 41 shown in FIGS. 6A to 6C is such designed that a portion of the film substrate 3a is used for the damming member 10 in the optical module 1 of FIG. 1.

In the optical module 41, the film substrate 3a of the substrate 3 is formed to be relatively thick, and the surface S of the film substrate 3a is formed with the relatively thin wiring pattern 11. For example, when using the optical fiber 2 with a cladding diameter of 80 μm, there may be used the substrate 3 with a thickness of the film substrate 3a of about 70 μm, and a thickness of the wiring pattern 11 of about 10 μm.

In the optical module 41, the film substrate 3a is formed with an optical fiber receiving groove 42 to receive the optical fiber 2 and to be filled with the optical fiber fixing resin 9, and is formed with an underfill groove 43 to be filled with the underfill resin 8, and the portion of the film substrate 3a that divides the optical fiber receiving groove 42 and the underfill groove 43 (the portion of the dividing wall that divides both the grooves 42 and 43) is used for the damming member 10.

The optical fiber receiving groove 42 is formed between the two wiring patterns 11 in the right side of FIG. 6A, while the underfill groove 43 is formed between the two wiring patterns 11 in the left side of FIG. 6A. A damming member 10 side end of each of the grooves 42 and 43 is formed with the vent 15 to allow unnecessary resins 8 and 9 to escape in the width direction during the filling.

In addition, in the optical module 41, one side (i.e. optical fiber receiving groove 42 side sidewall) of the damming member 10 (the portion of the film substrate 3a) is processed so as to be inclined to the surface of the film substrate 3a, and that inclined portion is formed with a metal film 44 by plating or the like, to form the mirror 7.

Further, in the optical module 41, metal films 45 are formed on the edges, respectively, of the mirror 7 side end of the optical fiber receiving groove 42, i.e. on portions of the film substrate 3a, which are facing the mirror 7, to form the reflecting portions 22, respectively. As the metal films 44 and 45, e.g. copper films may be used.

The optical module 41 can have the same function and advantage as those of the above-mentioned optical module 1, and allows for further thinning.

The invention is not limited to the above embodiments, but various alterations may naturally be made without departing from the spirit of the invention.

For example, although in the above embodiments only one optical device 4 (i.e. one channel) is provided, an optical device array in which a plurality of the optical devices are arrayed may be used for multi-channelization. In this case, an optical fiber array in which a plurality of optical fibers are arrayed is used in place of the optical fiber 2.

Further, although in the above embodiments the wiring pattern 11 or the film substrate 3a is used for the damming member 10, the damming member 10 is not limited thereto, but may be configured so that the damming member 10 is formed separately from the substrate 3, and is attached to the substrate 3.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical module, comprising:
   a substrate;
   an optical device comprising a surface-emitting element or a surface-receiving element mounted on a surface of the substrate with a light-emitting portion or a light-receiving portion located to face the surface of the substrate;
   an optical fiber disposed parallel to the surface of the substrate, and in a longitudinal direction of the substrate;
   a mirror provided to face the light-emitting portion or the light-receiving portion of the optical device and a tip of the optical fiber, and optically connect the optical device and the optical fiber;

an optical fiber receiving groove provided in the surface of the substrate to receive the optical fiber, a width of the mirror being greater than a width of the optical fiber receiving groove; and reflecting portions provided around an edge at a mirror side end of the optical fiber receiving groove, to reflect incident light from the mirror facing the edge back to the mirror.

2. The optical module according to claim 1, wherein each of side portions of the mirror, which face the reflecting portions, is not less than 50 μm in width.

3. The optical module according to claim 1, wherein a distance between a reflecting portion side end of the mirror and the reflecting portions is not more than 200 μm.

4. The optical module according to claim 1, further comprising a damming member provided between the optical device and the substrate to extend in a width direction of the substrate and partition a gap between the optical device and the substrate in a longitudinal direction of the substrate, wherein the mirror is provided on one optical fiber side of the damming member, wherein the gap on an opposite side of the damming member to the optical fiber is filled with an underfill resin, and wherein the gap on the optical fiber side of the damming member is filled with an optical fiber fixing resin.

5. A method for producing an optical module with a substrate; an optical device comprising a surface-emitting element or a surface-receiving element mounted on a surface of the substrate with a light-emitting portion or light-receiving portion located to face the surface of the substrate; an optical fiber disposed parallel to the surface of the substrate, and in a longitudinal direction of the substrate; a mirror provided to face the light-emitting portion or the light-receiving portion of the optical device and a tip of the optical fiber, and optically connect the optical device and the optical fiber; and an optical fiber receiving groove provided in the surface of the substrate to receive the optical fiber, a width of the mirror being greater than a width of the optical fiber receiving groove, the method comprising:

forming reflecting portions on edges, respectively, of a mirror side end of the optical fiber receiving groove to reflect incident light from the mirror facing the edges, again back to the facing mirror;

illuminating the mirror from above the substrate;

extracting a dark portion lying between portions brightened by reflection off the reflecting portions to thereby extract a mirror portion facing the optical fiber receiving groove; and aligning the optical device to locate the light-emitting portion or the light-receiving portion in the middle in top view of the mirror portion facing the optical fiber receiving groove, to mount the optical device.

6. The optical module according to claim 1, further comprising:

a damming member formed between the optical device and the substrate, the mirror being formed on an optical fiber side of the damming member.

7. The optical module according to claim 6, further comprising:

an underfill resin formed in the gap on a side of the damming member which is opposite the optical fiber; and an optical fiber fixing resin formed in the gap on the optical fiber side of the damming member.

8. The optical module according to claim 6, wherein the substrate comprises a wiring pattern formed on the surface of the substrate and including the damming member, the mirror being formed on an inclined portion of the wiring pattern.

9. The optical module according to claim 1, wherein the substrate comprises a wiring pattern formed on the surface of the substrate, the optical fiber receiving groove comprising a gap in the wiring pattern.

10. The optical module according to claim 9, wherein the wiring pattern comprises a side which faces the mirror, the reflecting portions being formed on the side of the wiring pattern.

11. The optical module according to claim 1, wherein the reflecting portions are substantially perpendicular to the surface of the substrate.

12. The optical module according to claim 1, wherein the mirror comprises a portion that faces the reflecting portions.

13. The optical module according to claim 1, wherein a longitudinal direction of the mirror is substantially perpendicular to a longitudinal direction of the optical fiber receiving groove.

14. An optical module, comprising:

a substrate including a surface comprising an optical fiber receiving groove, and a sidewall formed adjacent to the optical fiber receiving groove and substantially perpendicular to the surface of the substrate and the optical fiber receiving groove;

an optical device formed on the surface of a substrate, at least a portion of the optical device being over the optical fiber receiving groove;

an optical fiber formed in the optical fiber receiving groove;

a mirror formed between the substrate and the optical device and facing a tip of the optical fiber, for optically connecting the optical device and the optical fiber, a width of the mirror being greater than a width of the optical fiber receiving groove; and a reflecting portion formed on the sidewall of the substrate for reflecting incident light from the mirror back to the mirror.

* * * * *